Apr. 3, 1923.
M. A. ROSS
BEARING
Filed Nov. 16, 1921
1,450,307
2 sheets-sheet 1
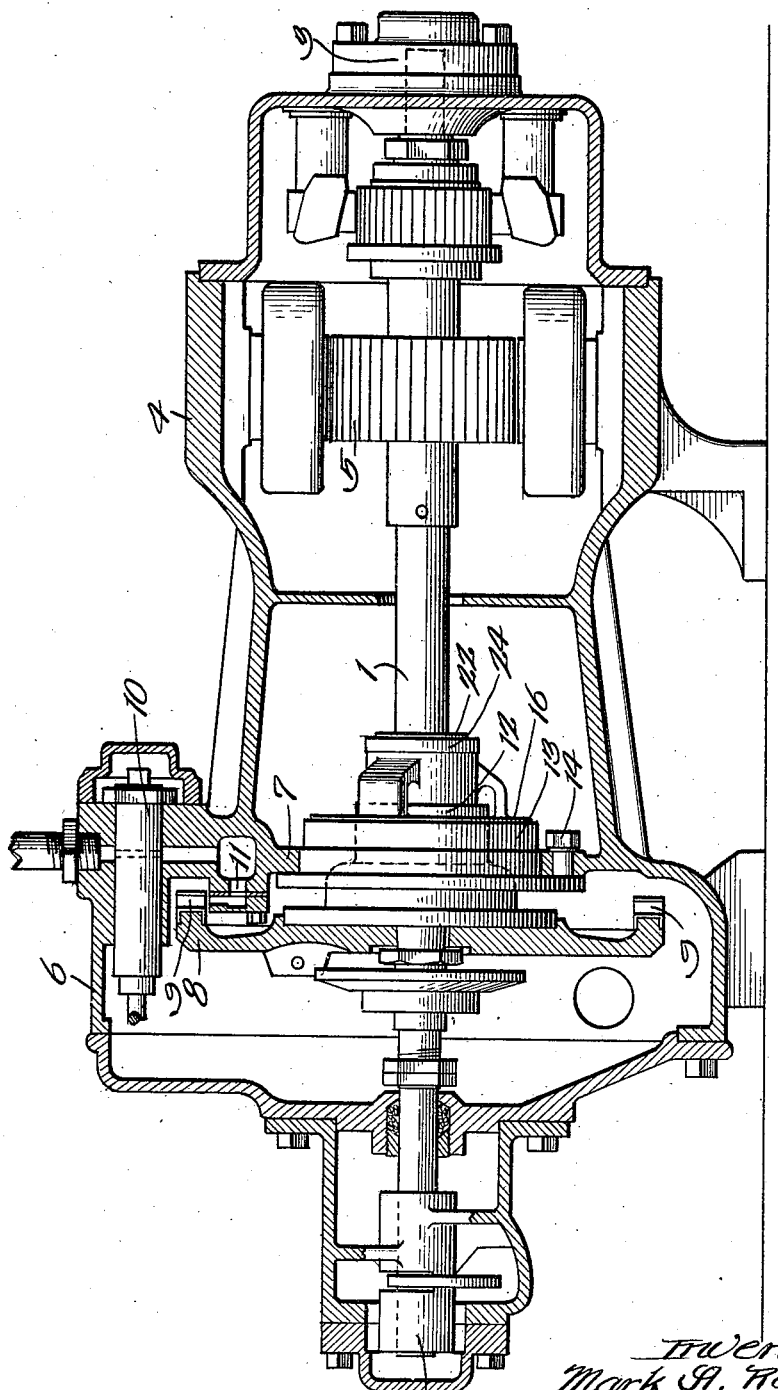

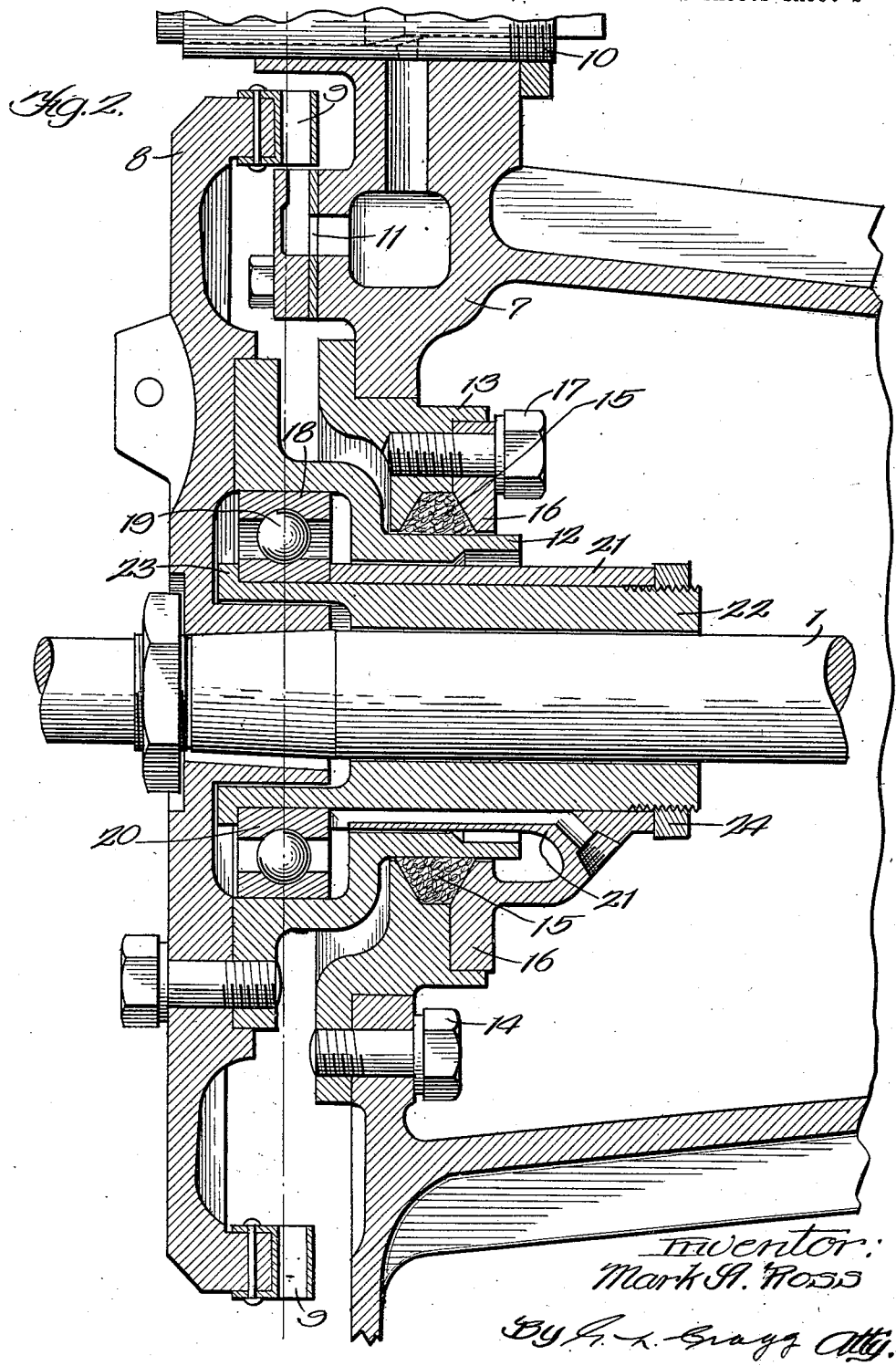

Patented Apr. 3, 1923.

1,450,307

UNITED STATES PATENT OFFICE.

MARK A. ROSS, OF FLOSSMOOR, ILLINOIS, ASSIGNOR OF ONE-HALF TO HARRY P. BAYLEY, OF CHICAGO, ILLINOIS.

BEARING.

Application filed November 16, 1921. Serial No. 515,551.

*To all whom it may concern:*

Be it known that I, MARK A. Ross, citizen of the United States, residing at Flossmoor, in the county of Cook and State of Illinois, have invented a certain new and useful Improvement in Bearings, of which the following is a full, clear, concise, and exact description.

My invention relates to turbines and also to bearings entering into the construction thereof and has a number of objects and advantages in view.

One main feature of the invention resides in an improved assembly of the raceways of a ball or other roller bearing and another main feature of the invention resides in an improved construction and arrangement whereby the raceways of the balls or other rollers therebetween are guarded from the access of moisture thereto, such as the spent steam in turbines.

In the bearing of my invention the inner raceway surrounds one sleeve that is formed to engage one side of the inner raceway and there is a second sleeve engaging the other side of the inner raceway at one end and having its other end engaged by a nut that is in threaded engagement with the first sleeve whereby the two sleeves serve to hold the inner raceway therebetween. In a steam turbine packing is applied between which and an impact wheel a roller bearing structure is disposed, the packing serving to prevent access to the bearing of exhaust steam whereby the bearing is prevented from rusting.

The invention, in all of its aspects, will be fully described by reference to the accompanying drawings in which Fig. 1 is a longitudinal sectional view of a steam turbine in combination with an electric generator, such apparatus being commonly employed upon locomotives for furnishing the electric headlights thereof with current; and Fig. 2 is a sectional view, on a larger scale, of a portion of the structure.

Like parts are indicated by similar characters of reference in both figures.

The turbine illustrated includes a suitable rotating shaft 1 mounted to turn in aligned bearings 2 and 3 that are located at the opposite ends of a casing that encloses the equipment, this casing including a section 4 in which the generator 5 is disposed and another section 6 in which the steam turbine, to be hereinafter sufficiently described, is disposed, the two compartments of the casing being separated by a wall portion or partition 7 whose purpose is to prevent the access of steam from the turbine side of the apparatus to the generator side. The turbine may be of any usual or suitable construction, the one shown including an impact wheel 8 with the impact receiving pockets 9 at the periphery thereof and upon that side thereof which faces the wall 7. The drawings illustrate suitable valve mechanism 10, well known to those skilled in the art, for directing the steam or other operating fluid through the discharge nozzle 11 and against the pockets 9, the spent steam passing from the pockets into the section 6 of the casing from whence the steam finds access to the external atmosphere.

The impact wheel is formed with a hollow tubular extension 12 that surrounds and is spaced apart from the shaft 1. The wall 7 is preferably formed in sections, the outer section being integrally cast with the casing portion 4 and the inner section 13 being assembled with the outer section in any suitable way as by means of the bolts 14. A substantially fluid tight packing 15 is assembled with the inner part 13 of the wheel 7 and is in contact with the hollow extension 12 whereby exhaust steam from the impact wheel cannot find access to the casing section 4 nor to the roller bearing structure which is hereinafter to be described. This packing is desirably held in position by means of a ring 16 clamped in position by means of the bolts 17. The extension 12 of the impact wheel 8 has provided thereupon and therein the outer roller bearing raceway 18 that is preferably separately formed from said extension. Balls or other rollers 19 are interposed between the outer raceway 18 and the inner raceway 20. A sleeve 21 is assembled with the wheel 7 preferably by being a part of the same integral casting with the ring 16. This sleeve is surrounded by the hollow extension 12 of the wheel 8 and has one end engaging one side of the inner raceway 20. A second sleeve 22 is surrounded by and is movable longitudinally of the stationary sleeve 21. The sleeve 22 has a flange 23 engaging the other side of the inner raceway. A nut 24 is threaded upon the sleeve 22 and engages the other end of the sleeve 21. By turning the nut the inner raceway 20 may be suitably held or clamped between said sleeves. The raceways and the balls or other rollers therebetween are disposed between the impact wheel 8 and the packing 15 which guards said bearing elements from the access thereto of exhaust steam, whereby rusting of the bearing is prevented, a serious drawback in turbine structures.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a turbine, the combination with the rotating shaft thereof; of an impact wheel upon the shaft and having a hollow extension surrounding and spaced apart from the shaft; a wall surrounding said hollow extension; a substantially fluid tight packing between said wall and hollow extension; an outer roller bearing raceway upon and within the hollow extension; an inner raceway; rollers between said raceways; a sleeve upon said wall and surrounded by the aforesaid hollow extension of said wheel and having one end engaging one side of the inner raceway; a second sleeve surrounded by and movable longitudinally of the first and surrounding the shaft, this second sleeve engaging the other side of the inner raceway; and a nut in threaded engagement with the second sleeve and abutting against the other end of the first sleeve to hold the inner raceway between said sleeves, said raceways and rollers being between said wheel and packing.

2. In a turbine, the combination with the rotating shaft thereof; of an impact wheel upon the shaft and having a hollow extension surrounding and spaced apart from the shaft; a wall surrounding said extension; a substantially fluid tight packing between said wall and hollow extension; an outer roller bearing raceway upon and within the hollow extension; an inner raceway; rollers between said raceways; a sleeve upon said wall and surrounded by the aforesaid hollow extension of said wheel and having one end engaging one side of the inner raceway; a second sleeve surrounded by and movable longitudinally of the first and surrounding the shaft, this second sleeve engaging the other side of the inner raceway; and a nut in threaded engagement with the second sleeve and abutting against the other end of the first sleeve to hold the inner raceway between said sleeves.

3. The combination with a rotating shaft; of a rotating member upon the shaft and having a hollow extension surrounding and spaced apart from the shaft; a wall surrounding said hollow extension; a substantially fluid tight packing between said wall and hollow extension; an outer roller bearing raceway upon and within the hollow extension; an inner raceway; rollers between said raceways; a sleeve upon said wall and surrounded by the aforesaid hollow extension of said rotating member and having one end engaging one side of the inner raceway; a second sleeve surrounded by and movable longitudinally of the first and surrounding the shaft, this second sleeve engaging the other side of the inner raceway; and a nut in threaded engagement with the second sleeve and abutting against the other end of the first sleeve to hold the inner raceway between said sleeves, said raceways and rollers being between said rotating member and packing.

4. The combination with a rotating shaft; of a rotating member upon the shaft and having a hollow extension surrounding and spaced apart from the shaft; a wall surrounding said hollow extension; a substantially fluid tight packing between said wall and hollow extension; an outer roller bearing raceway upon and within the hollow extension; an inner raceway; rollers between said raceways; a sleeve upon said wall and surrounded by the aforesaid hollow extension of said rotating member and having one end engaging one side of the inner raceway; a second sleeve surrounded by and movable longitudinally of the first and surrounding the shaft, this second sleeve engaging the other side of the inner raceway; and a nut in threaded engagement with the second sleeve and abutting against the other end of the first sleeve to hold the inner raceway between said sleeves.

5. The combination with a rotating shaft; of a rotating member upon the shaft and having a hollow extension surrounding and spaced apart from the shaft; a wall surrounding said hollow extension; an outer roller bearing raceway upon and within the hollow extension; an inner raceway; rollers between said raceways; a sleeve upon said wall and surrounded by the aforesaid hollow extension of said rotating member and having one end engaging one side of the inner raceway; a second sleeve surrounded by and movable longitudinally of the first and surrounding the shaft, this second sleeve engaging the other side of the inner raceway; and a nut in threaded engagement with the second sleeve and abutting against the other end of the first sleeve to hold the inner raceway between said sleeves.

6. The combination with a rotating shaft; of a rotating member upon the shaft and having a hollow extension surrounding and spaced apart from the shaft; an outer roller bearing raceway upon and within the hollow extension; an inner raceway; rollers between said raceways; a sleeve surrounded by the aforesaid hollow extension of said rotating member and having one end engaging one side of the inner raceway; a second sleeve surrounded by and movable longitudinally of the first and surrounding the shaft, this second sleeve engaging the other side of the inner raceway; and a nut in threaded engagement with the second sleeve and abutting against the other end of the first sleeve to hold the inner raceway between said sleeves.

In witness whereof, I hereunto subscribe my name this 9th day of November A. D., 1921.

MARK A. ROSS.